(12) United States Patent
Yip et al.

(10) Patent No.: US 10,992,918 B2
(45) Date of Patent: Apr. 27, 2021

(54) METHOD AND APPARATUS FOR PROCESSING 360-DEGREE IMAGE

(71) Applicant: Samsung Electronics Co., Ltd., Suwon-si (KR)

(72) Inventors: Eric Yip, Seoul (KR); Byeong-Doo Choi, Suwon-si (KR); Jae-Yeon Song, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 61 days.

(21) Appl. No.: 16/076,917

(22) PCT Filed: Feb. 13, 2017

(86) PCT No.: PCT/KR2017/001565
§ 371 (c)(1),
(2) Date: Aug. 9, 2018

(87) PCT Pub. No.: WO2017/138801
PCT Pub. Date: Aug. 17, 2017

(65) Prior Publication Data
US 2019/0052858 A1 Feb. 14, 2019

(30) Foreign Application Priority Data
Feb. 12, 2016 (KR) .................. 10-2016-0016521

(51) Int. Cl.
*H04N 13/139* (2018.01)
*H04N 5/232* (2006.01)
(Continued)

(52) U.S. Cl.
CPC ......... *H04N 13/139* (2018.05); *G06T 3/0031* (2013.01); *G06T 3/0062* (2013.01);
(Continued)

(58) Field of Classification Search
CPC .. H04N 13/139; H04N 13/194; H04N 13/161; H04N 5/232; H04N 5/23238; H04N 13/00; G06T 3/0031; G06T 3/0062
See application file for complete search history.

(56) References Cited

U.S. PATENT DOCUMENTS 6,754,400 B2    6/2004   Florin et al.
7,292,722 B2   11/2007   Lelescu et al.
(Continued)

FOREIGN PATENT DOCUMENTS

CN    102687177 A    9/2012
CN    104063843 A    9/2014
(Continued)

OTHER PUBLICATIONS

Madhukar Budagavi et al., 360 Degrees Video Coding Using Region Adaptive Smooting. XP03282651. Samsung Research America, Dallas Northwestern University, Evanston, IL. ICIP 2015. Published on Sep. 27, 2015. pp. 750-754.
(Continued)

*Primary Examiner* — Mishawn N. Hunter
(74) *Attorney, Agent, or Firm* — Jefferson IP Law, LLP

(57) ABSTRACT

A communication technique for merging, with an IoT technology, a 5G communication system for supporting a data transmission rate higher than that of a 4G system is provided. The communication technique can be applied to an intelligent service (for example, smart home, smart building, smart city, smart car or connected car, health care, digital education, retail business, and security and safety-related services, and the like) on the basis of a 5G communication technology and an IoT-related technology. A method for processing a 360-degree image is provided. The method includes determining a three-dimensional (3D) model for mapping a 360-degree image; determining a partition size for the 360-degree image; determining a rotational angle for (Continued)

each of the x, y, and z axes of the 360-degree image; determining an interpolation method to be applied when mapping the 360-degree image to a two-dimensional (2D) image; and converting the 360-degree image into the 2D image.

13 Claims, 9 Drawing Sheets

(51) Int. Cl.
*H04N 13/00* (2018.01)
*G06T 3/00* (2006.01)
*H04N 13/194* (2018.01)
*H04N 13/161* (2018.01)

(52) U.S. Cl.
CPC ......... *H04N 5/232* (2013.01); *H04N 5/23238* (2013.01); *H04N 13/00* (2013.01); *H04N 13/161* (2018.05); *H04N 13/194* (2018.05)

(56) References Cited

U.S. PATENT DOCUMENTS

| | | | |
|---|---|---|---|
| 8,744,169 | B2 | 6/2014 | Othmezouri et al. |
| 8,817,067 | B1 | 8/2014 | Fan et al. |
| 2004/0105597 | A1 | 6/2004 | Lelescu et al. |
| 2009/0276724 | A1* | 11/2009 | Rosenthal ............. G06F 3/0482 715/771 |
| 2011/0254915 | A1 | 10/2011 | Vincent et al. |
| 2013/0293687 | A1* | 11/2013 | Seto ..................... H04N 13/122 348/51 |
| 2014/0085295 | A1 | 3/2014 | Li |
| 2014/0282283 | A1* | 9/2014 | Glebocki ............ G06F 3/04815 715/863 |
| 2015/0363962 | A1* | 12/2015 | Schmidt .................. G06F 16/56 345/424 |
| 2016/0071320 | A1* | 3/2016 | Smith .................. G02B 27/017 345/633 |

FOREIGN PATENT DOCUMENTS

| | | |
|---|---|---|
| CN | 104740874 A | 7/2015 |
| JP | 2010-170514 A | 8/2010 |
| KR | 10-2010-0039635 A | 4/2010 |
| KR | 10-1340598 B1 | 12/2013 |
| WO | 2014043814 A1 | 3/2014 |

OTHER PUBLICATIONS

Frank Nielson. Surround Video: A Multihead Camera Approach. Sony Computer Science Labratories, Tokyo, Japan. XP035876533. The Visual Computer (2005) Digital Object Identifier. Published on Feb. 3, 2005. pp. 92-103.

Karen A. Mulcahy et al. Symbolization of Map Projection Distortion: A Review. XP009165845. Cartography and Geographic Information Science, vol. 28, No. 3, 2001. Dates Jan. 1, 2001. pp. 167-181.

European Search Report dated Feb. 12, 2019, issued in European Application No. 17750493.3-1210 / 3416372.

Richard Szeliski et al., "Creating Full View Panoramic Image Mosaics and Environment Maps", Proc. of the 24th Annual Conf. on Computer Graphics and Interactive Techniques, SIGGRAPH '97, ACM, New York, USA, Aug. 3, 1997, pp. 251-258, XP058375836.

Chinese Office Action dated Feb. 3, 2020, issued in Chinese Patent Application No. 201780010857.3.

European Office Action dated Jan. 22, 2020, issued in European Patent Application No. 17750493.3.

* cited by examiner

METHOD AND APPARATUS FOR PROCESSING 360-DEGREE IMAGE

CROSS-REFERENCE TO RELATED APPLICATION(S)

This application is a U.S. National Stage application under 35 U.S.C. § 371 of an International application number PCT/KR2017/001565, filed on Feb. 13, 2017, which is based on and claimed priority of a Korean patent application number 10-2016-0016521, filed on Feb. 12, 2016, in the Korean Intellectual Property Office, the disclosure of which is incorporated by reference herein in its entirety.

BACKGROUND

1. Field

The present disclosure relates to methods and apparatuses for processing 360-degree images, and in particular, to methods and apparatuses for processing 360-degree images, which may be applicable to virtual-reality imaging devices for more immersive media image services over legacy ultra-HD (UHD) displays.

2. Description of the Related Art

In order to meet the demand for wireless data traffic soaring since the 4 G communication system came to the market, there are ongoing efforts to develop enhanced 5 G communication systems or pre-5 G communication systems. For the reasons, the 5 G communication system or pre-5 G communication system is called the beyond 4 G network communication system or post LTE system.

For higher data transmit rates, 5 G communication systems are considered to be implemented on ultra high frequency bands (mmWave), such as, e.g., 60 GHz. To mitigate pathloss on the ultra high frequency band and increase the reach of radio waves, the following techniques are taken into account for the 5 G communication system: beamforming, massive multi-input multi-output (MIMO), full dimensional MIMO (FD-MIMO), array antenna, analog beamforming, and large scale antenna.

Also being developed are various technologies for the 5 G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and reception interference cancellation.

There are also other various schemes under development for the 5 G system including, e.g., hybrid FSK and QAM modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

Meanwhile, the Internet is evolving from the human-centered connection network by which humans create and consume information to the Internet of Things (IoT) network by which information is communicated and processed between things or other distributed components. The Internet of Everything (IoE) technology may be an example of a combination of the Big data processing technology and the IoT technology through, e.g., a connection with a cloud server.

To implement the IoT, technology elements, such as a sensing technology, wired/wireless communication and network infra, service interface technology, and a security technology, are required. There is a recent ongoing research for inter-object connection technologies, such as the sensor network, Machine-to-Machine (M2M), or the Machine-Type Communication (MTC).

In the IoT environment may be offered intelligent Internet Technology (IT) services that collect and analyze the data generated by the things connected with one another to create human life a new value. The IoT may have various applications, such as the smart home, smart building, smart city, smart car or connected car, smart grid, health-care, or smart appliance industry, or state-of-art medical services, through conversion or integration of existing IT technologies and various industries.

Thus, there are various ongoing efforts to apply the 5 G communication system to the IoT network. For example, the sensor network, machine-to-machine (M2M), machine type communication (MTC), or other 5 G techniques are implemented by schemes, such as beamforming, multi-input multi-output (MIMO), and array antenna schemes. The above-mentioned application of the cloud radio access network as a Big data processing technique may be said to be an example of the convergence of the 5 G and IoT technologies.

Meanwhile, a 360-degree image processing device for virtual reality (VR) may generate a 3D image by mapping 360-degree multi-view images captured by multiple cameras to a surface, such as a three-dimensional (3D) model, e.g., a sphere, a cube, or a cylinder, and a display device (HMD) may render a scene corresponding to a particular view of the generated 3D image and displays the rendered scene to the user. At this time, required to transmit 360-degree image content to a user who is located far away are a device capable of compressing, storing, and transmitting the 360-degree image content and a format for transmission, but no such device and transmission format exist currently.

Thus, a need exists for research on devices capable of compressing, storing, and transmitting 360-degree image content and transmission formats.

SUMMARY

According to an embodiment of the present disclosure, there are proposed a method and apparatus for processing 360-degree images.

According to an embodiment of the present disclosure, there are proposed a method and apparatus for converting 360-degree images into 2D images.

According to an embodiment of the present disclosure, there are proposed a method and apparatus for creating metadata for parameters considered upon converting 360-degree images into 2D images.

According to an embodiment of the present disclosure, there are proposed a method and apparatus for restoring 2D images into 360-degree images based on parameters considered upon converting the 360-degree images into the 2D images.

According to an embodiment of the present disclosure, a method for processing a 360-degree multi-view image comprises determining a three-dimension (3D) model to map the 360-degree multi-view image to a 3D image, generating the 360-degree multi-view image as the 3D image based on the determined 3D model, determining a partition size for the 3D image, determining a rotating angle for each of an x axis, a y axis, and a z axis of the 3D image, and converting the 3D image into a two-dimension (2D) image based on the determined partition size and rotating angle.

According to another embodiment of the present disclosure, a method for processing a 360-degree multi-view image comprises identifying metadata related to converting a 2D image into the 360-degree multi-view image and the 2D image, obtaining, from the metadata, information related to a partition size for the 360-degree multi-view image and a rotating angle for each of an x axis, a y axis, and a z axis of the 360-degree multi-view image, and converting the 2D image into the 360-degree image based on the obtained information.

According to an embodiment of the present disclosure, a device for processing a 360-degree multi-view image comprises a controller configured to determine a 3D model to map the 360-degree multi-view image to a 3D image, generate the 360-degree multi-view image as the 3D image based on the determined 3D model, determine a partition size for the 3D image, and determine a rotating angle for each of an x axis, a y axis, and a z axis of the 3D image and a converter configured to convert the 360-degree image into a 2D image based on the determined partition size and rotating angle.

According to another embodiment of the present disclosure, a device for processing a 360-degree multi-view image comprises a controller configured to identify metadata related to converting a 2D image into the 360-degree multi-view image and the 2D image and obtain, from the metadata, information related to a partition size for the 360-degree multi-view image and a rotating angle for each of an x axis, a y axis, and a z axis of the 360-degree multi-view image and an inverse-converter configured to convert the 2D image into the 360-degree image based on the obtained information.

Other aspects, advantages, and core features of the present disclosure will be apparent to one of ordinary skill in the art from the following detailed description of exemplary embodiments of the present disclosure, taken into conjunction with the drawings.

Other aspects, advantages, and core features of the present disclosure will be apparent to one of ordinary skill in the art from the following detailed description of exemplary embodiments of the present disclosure, taken into conjunction with the drawings.

An embodiment of the present disclosure has the effect of processing 360-degree images.

According to an embodiment of the presents the effect of converting 360-degree images into 2D images.

According to an embodiment of the present disclosure provides the effect of creating metadata for parameters considered upon converting 360-degree images into 2D images.

According to an embodiment of the present disclosure gives the effect of restoring 2D images into 360-degree images based on parameters considered upon converting the 360-degree images into the 2D images.

BRIEF DESCRIPTION OF THE DRAWINGS

Particular preferred embodiments of the present disclosure and the foregoing and other aspects, features, and advantages will be apparent from the following detailed description taken in conjunction with the accompanying drawings, wherein.

It should be noted that the same or similar reference denotations may be used to refer to the same or similar elements, features, or structures throughout the drawings.

DETAILED DESCRIPTION

Hereinafter, embodiments of the present disclosure are described in detail with reference to the accompanying drawings.

According to various embodiments of the present disclosure, the electronic devices include virtual reality (VR) devices (e.g., 360-degree image cameras, head-mounted devices (HMDs), or smart glasses), smartphones, tablet personal computers (PCs), mobile phones, video phones, electronic book readers, desktop PCs, laptop PCs, netbook PCs, personal digital assistants (PDAs), portable multimedia players (PMPs), MP3 players, mobile medical devices, cameras, wearable devices (e.g., HMDs), electronic clothing, electronic bracelets, electronic necklaces, electronic appcessories, electronic tattoos, or smartwatches.

Further, according to an embodiment of the present disclosure, the electronic device may include, e.g., a smart home device, e.g., a television, a digital video disk (DVD) player, an audio player, a refrigerator, an air conditioner, a vacuum cleaner, an oven, a microwave oven, a washer, a drier, an air cleaner, a set-top box, a TV box, a gaming console, an electronic dictionary, a camcorder, or an electronic picture frame.

Further, according to an embodiment of the present disclosure, the electronic device includes, e.g., a medical device, a navigation device, a global positioning system (GPS) receiver, an event data recorder (EDR), a flight data recorder (FDR), an automotive infotainment device, a sailing electronic device, an aviation electronic device, a security device, or an industrial or home robot.

According to various embodiments of the present disclosure, an electronic device may be a combination of the above-listed devices. It should be appreciated by one of ordinary skill in the art that the electronic device is not limited to the above-described devices.

Figure 1:
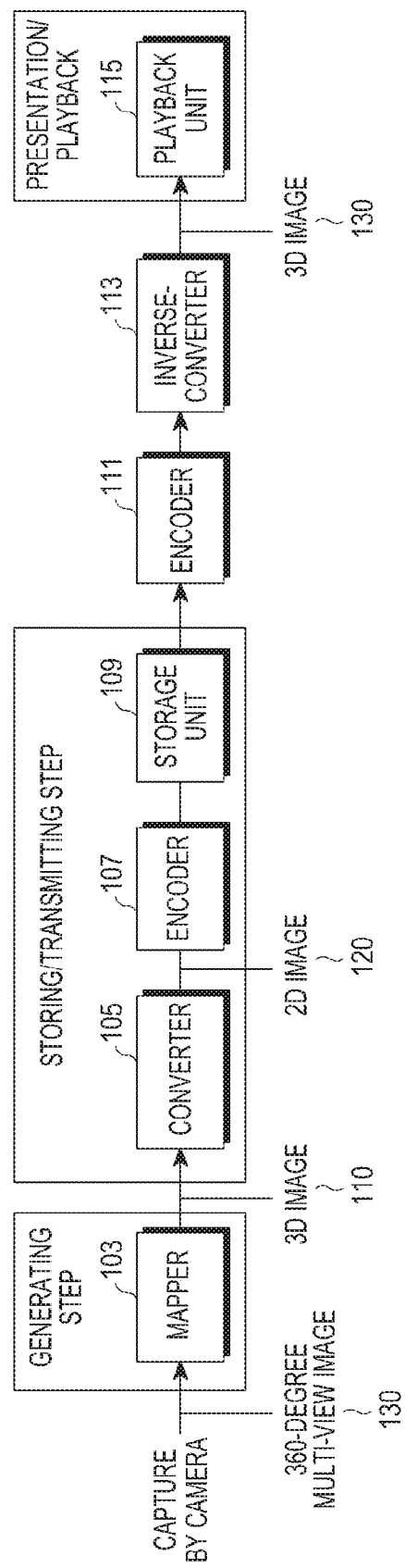
FIG. 1 is a block diagram illustrating components of an image processing device processing a 360-degree image.

FIG. 1 is a block diagram illustrating components of an image processing device processing a 360-degree image.

Referring to FIG. 1, the image processing device illustrated includes a mapper 103, a converter 105, an encoder 107, a storage unit 109, a decoder 111, an inverse-converter 113, and a playback unit 115.

A 360-degree multi-view image 100 captured by multiple cameras is input to the mapper 103, and the mapper 103 maps the 360-degree multi-view image 100 to a 3D model, e.g., the surface of a sphere, generating and outputting a 3D image 110.

The 3D image 110 is input to the converter 105, and the converter 105 converts the input 3D image 110 into a 2D image 120 and outputs the 2D image. The 2D image 120 is input to the encoder 107, and the encoder 107 encodes the input 2D image 120 using a predetermined encoding scheme and outputs the encoded image. The encoded 2D image is stored in the storage unit 109.

The 2D image output from the storage unit is input to the decoder 111, and the decoder 111 decodes the input image using a predetermined decoding scheme and outputs the decoded image. The decoded 2D image is input to the inverse-converter 113, and the inverse-converter 113 inverse-converts the input 2D image into a 3D image and outputs the 3D image.

The inverse-converted 3D image 130 is input to the playback unit 115, and the playback unit 115 displays the input image.

The above-described 360-degree multi-view image may be at least one input image containing an image for each direction. Further, the above-described 3D image may be any one of a 360-degree video, an omnidirectional video, or omnidirectional media. The omnidirectional media is a head-mounted device (HMD). The 2D image may be a projected frame or a packed frame.

Specifically, projection means one set of input images being projected as the projected frame. The projected frame means a frame specified by a 360 video projection format indicator. The packed frame means a frame that originates from a region-wise packing of the projected frame. In a stereoscopic 360-degree video, input images at one time instance are stitched, generating projected frames representing two views, one for each eye. The two views are mapped to the packed frames that are the same.

As such, the image processing device shown in FIG. 1 generates the 3D image 111 based on the input 360-degree multi-view image 100, then converting into the 2D image 120 and storing the 2D image 120, then inverse-converting into the 3D image 130 and transmitting the 3D image 130. The operations of the image processing device may include a generating step in which the mapper 103 generates the 3D image 110 based on the 360-degree multi-view image 100, a storing/transmitting step in which the converter 105, the encoder 107, and the storage unit 109 convert the 3D image 110 into the 2D image 120 and store and transmit the 2D image, and a presenting/playing step in which the playback unit 115 inverse-converts the 2D image 120 into the 3D image 130 and displays the 3D image 130.

Figure 2A:
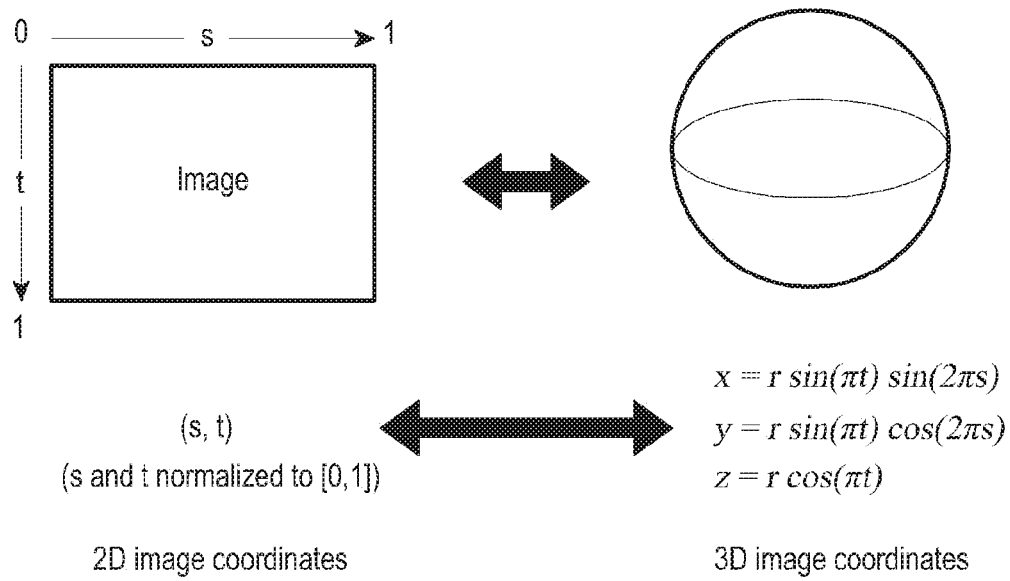
FIGS. 2A, 2B and 2C are views illustrating examples of conversion/inverse-conversion between a 2D image and a 3D image.
Figure 2B:
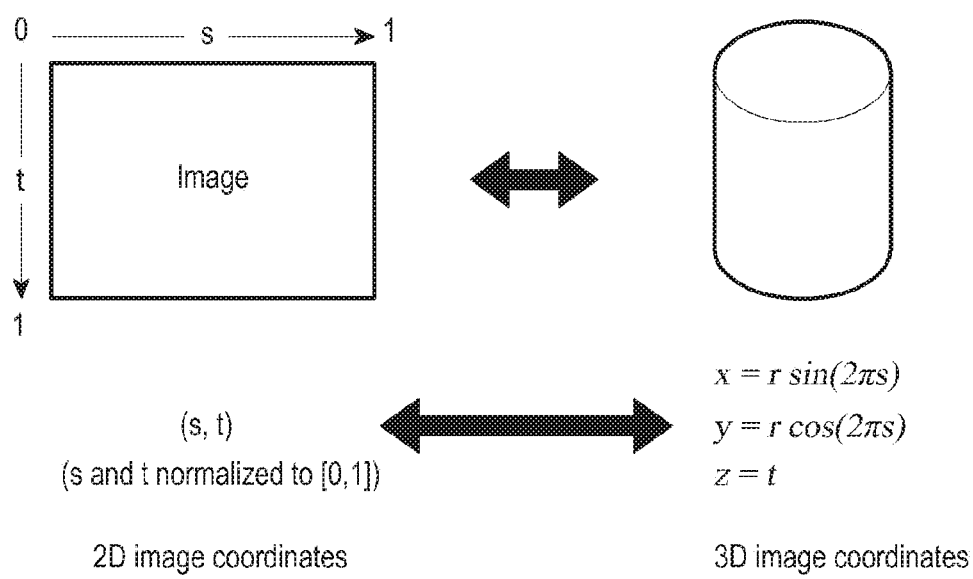
Figure 2C:
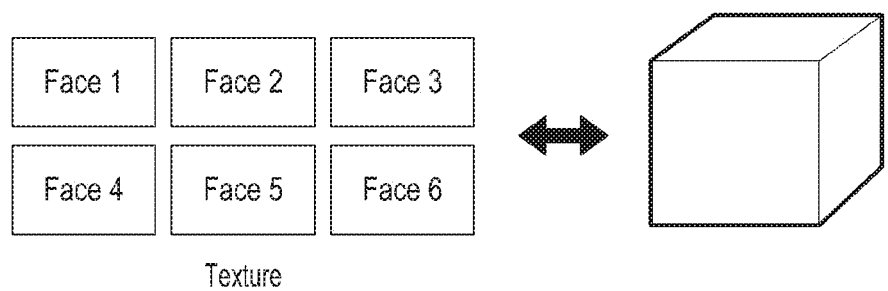

FIGS. 2A to 2C are views illustrating examples of conversion/inverse-conversion between a 2D image and a 3D image.

FIG. 2A illustrates an example of mapping a 2D image to the surface of a sphere which is a 3D model. Assuming that the coordinates of the 2D image are (s,t), the 3D image coordinates on the surface of the sphere may be expressed as $x=r \sin(\pi t) \sin(2\pi s)$, $y=r \sin(\pi t) \cos(2\pi s)$, $z=r \cos(\pi t)$, and conversion/inverse-conversion between the 2D image and the 3D image may be performed via the 2D image coordinates and the 3D image coordinates.

FIG. 2B illustrates an example of mapping a 2D image to the surface of a cylinder which is a 3D model. Assuming that the coordinates of the 2D image are (s,t), the 3D image coordinates on the surface of the cylinder may be expressed as $x=r \sin(2\pi s)$, $y=r \cos(2\pi s)$, $z=t$, and conversion/inverse-conversion between the 2D image and the 3D image may be performed via the 2D image coordinates and the 3D image coordinates.

FIG. 2C illustrates an example of mapping a 2D image to a cube which is a 3D model. The 2D image may be represented with six textures corresponding to the six faces of the cube, and each of the textures may be mapped to a respective one of the faces of the cube, thereby converting into the 3D image. The 3D image may be inverse-converted into the 2D image by de-mapping each of the faces of the cube to a respective one of the six textures.

Mapping the 2D image to the surface of which one of the sphere, cylinder, and cube which are 3D models may be determined by a generator that generates VR content (i.e., the 3D image), e.g., the mapper, and information related to the mapping is transmitted to the user terminal in the form of metadata.

Although the mapping schemes shown in FIGS. 2A to 2C have their own pros and cons, they all may commonly cause image distortion during the conversion. In particular, in the case of equirectangular projection that converts 360-degree spherical images into 2D images, the top, bottom, and corners of the 2D image may be distorted relatively more than the center, considerably deteriorating immersion when the top, bottom, and corners of the 2D image are viewed on the HMD device.

Figure 3:
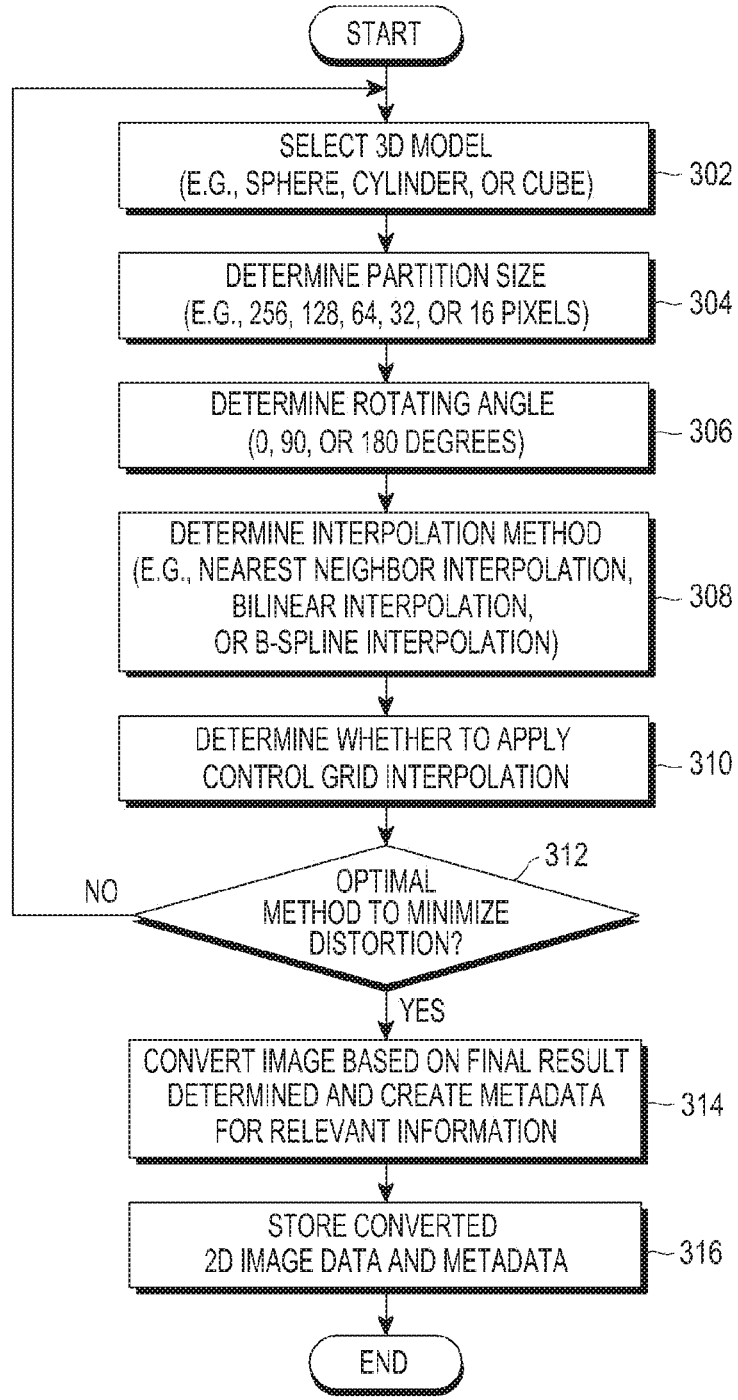
FIG. 3 is a flowchart illustrating operations by an image processing device to convert a 360-degree image into a 2D image according to an embodiment of the present disclosure.

FIG. 3 is a flowchart illustrating operations by an image processing device to convert a 360-degree image into a 2D image according to an embodiment of the present disclosure.

Referring to FIG. 3, in step 302, the image processing device determines a 3D model to which to map a 360-degree image. Here, the 3D model may be, e.g., a sphere, a cylinder, a cube, a pyramid, or a polyhedron. In step 304, the image processing device determines a partition size for the 3D image mapped to the 3D model selected in step 302. The partition size may be denoted with, e.g., the number of horizontal pixels and the number of vertical pixels, and may be, e.g., 256, 128, 64, 32, or 16 pixels. As another example, the partition size may be represented as an angular interval along the horizontal and vertical directions, and may be, e.g., 90°, 60°, 45°, 30°, or 15°. In step 304, the partition size is determined as a value to minimize the entire rate-distortion (RD) cost considering the degree of distortion of the entire image and the amount of metadata generated.

In step 306, the image processing device determines a rotating angle related to each of three directions, i.e., x, y, and z axes, for the 3D image. The rotating angle may be, e.g., 0, 90, or 180 degrees. In step 308, the image processing device determines an interpolation method to apply upon converting (or mapping) the 3D image to the 2D image. The interpolation method may be, e.g., nearest neighbor interpolation, bilinear interpolation, or b-spline interpolation. In step 310, the image processing device determines whether to apply control grid interpolation upon converting the 3D image into the 2D image. Here, control grid interpolation means warping into a different shape by shifting corners of regions partitioned in polygonal shape, e.g., triangle or rectangle, by a predetermined distance (dx, dy) when partitioning the 3D image according to the partition size determined in step 304.

In step 312, the image processing device checks whether converting the 3D image into the 2D image based on the result determined in steps 302 to 310 is the optimal way to minimize distortion at a predetermined bitrate. Where, as a result of checking in step 312, converting the 3D image into the 2D image based on the result determined in steps 302 to 310 is the optimal method, the image processing device proceeds with step 314, converting the 360-degree image into the 2D image based on the final result determined and creating metadata for information related to the conversion. Here, the conversion-related information basically includes information related to the 3D model determined in step 302, information related to the partition size determined in step 304, information about the rotating angle determined in step 306, and information about the interpolation method determined in step 308, and may additionally include the information about whether to apply control grid interpolation as determined in step 310.

In step 316, the image processing device stores the converted 2D image data and the metadata related to the conversion.

Figure 4A:
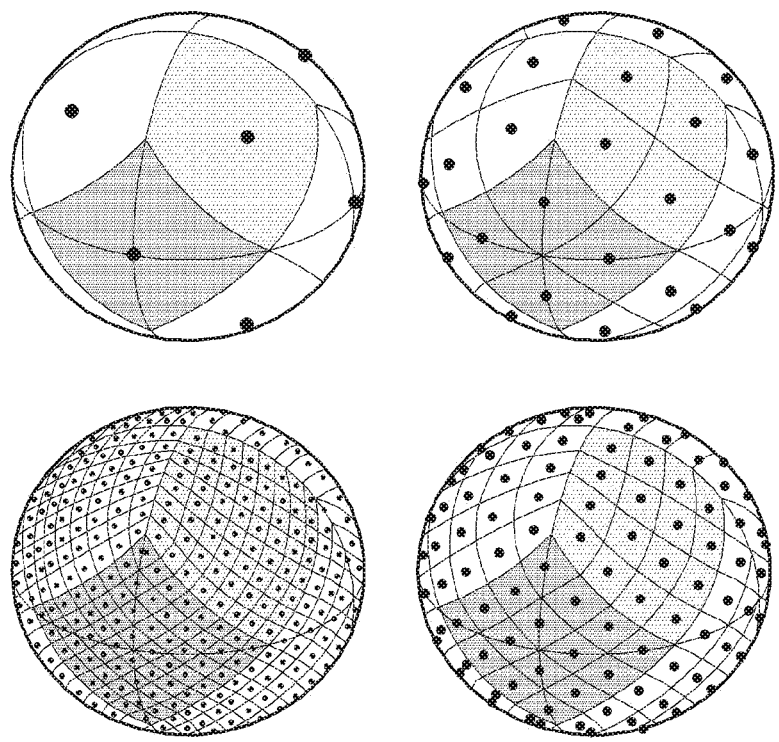
FIGS. 4A and 4B are views illustrating an example of adaptively determining a partition size considered upon converting a 3D image into a 2D image according to an embodiment of the present disclosure.
Figure 4B:
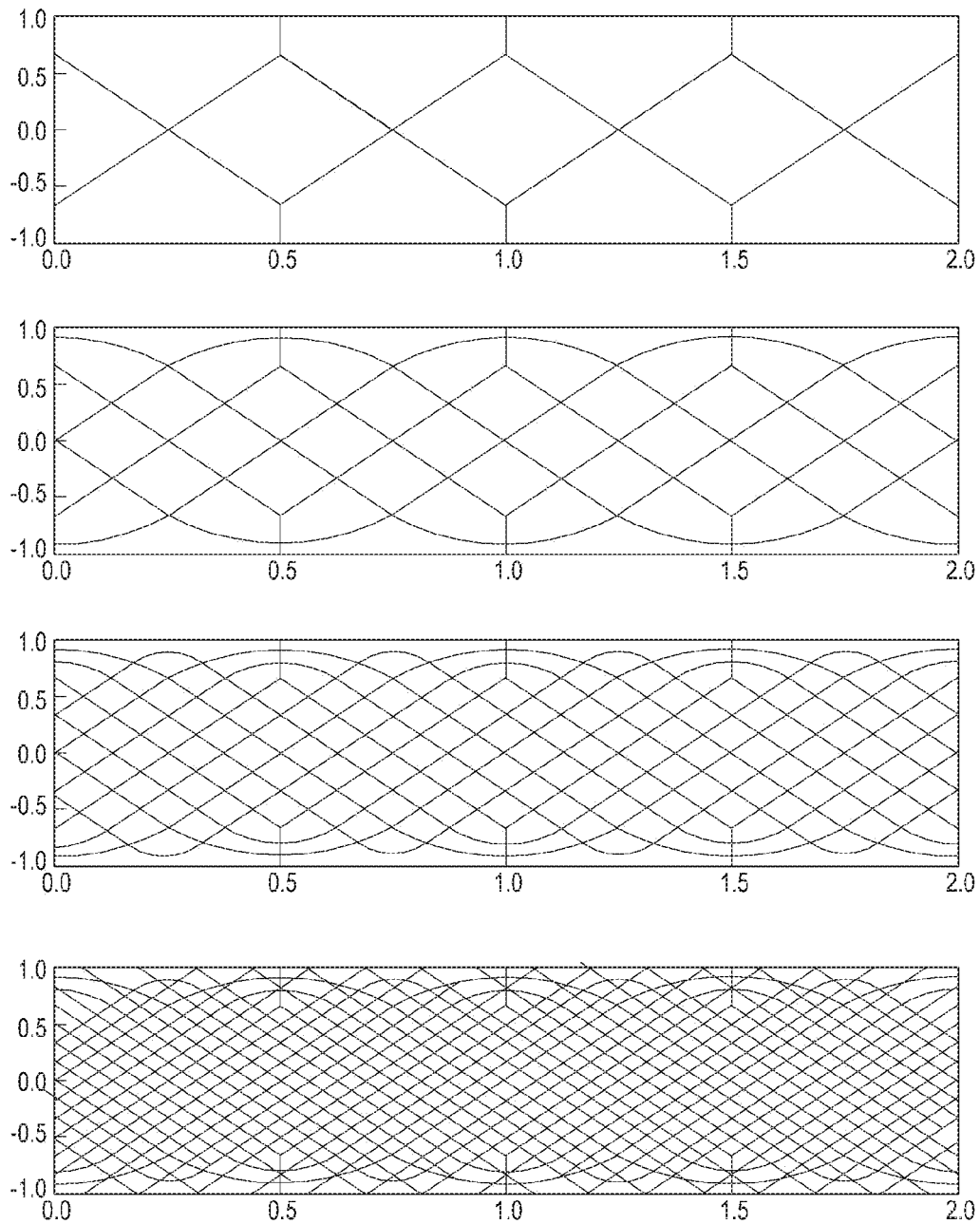

FIGS. 4A and 4B are views illustrating an example of adaptively determining a partition size considered upon converting a 3D image into a 2D image according to an embodiment of the present disclosure.

Where a 3D image for VR exists as a 360-degree spherical image, the spherical surface may be partitioned into various sizes as shown in FIG. 4A. Further, the 360-degree spherical image may be converted into the 2D image shown in FIG. 4B using cartography mapping, such as equirectangular projection. At this time, the pixel value corresponding to each partitioned region of the 2D image is determined to be the same as the pixel value corresponding to each partitioned region of the spherical surface, and mapping a particular region among the partitioned regions of the 2D image to a particular region among the partitioned regions of the spherical image is determined by an algorithm used to convert the 3D image into the 2D image.

Where one pixel of the 360-degree spherical image is precisely mapped to one pixel of the 2D image upon converting the 3D image into the 2D image, the pixel value of the 2D image is determined as the corresponding pixel value of the 360-degree spherical image. However, where one pixel of the 360-degree spherical image is mapped to a point midway between the pixels of the 2D image, the pixel value of the 2D image is determined by interpolation that is based on the value of the neighbor pixels.

For memory bandwidth and pipeline processing, mapping in units of blocks are efficient, and the partitioned regions as shown in FIG. 4A are mapped to the partitioned regions as shown in FIG. 4B. At this time, the partitioned regions of the 2D image as shown in FIG. 4B differ in shape depending on relevant positions, and thus, the converting method (or equation) and the degree of distortion may be varied for each of the partitioned regions of the 2D. To minimize the distortion of the whole image, thus, material contents in the image may be arranged in low-distortion ones among the partitioned regions while relatively immaterial contents, such as the background, in the image are placed in high-distortion regions. Resultantly, it is very critical to determine the partitioned region of the 2D image, to which each of the partitioned region of the 3D image is to be mapped per content, and such mapping relation may be designated by providing a guide to the mapper which generates the contents, by analyzing the image content to allow the material object to be less distorted, or by converting the 3D image into the 2D image as per each mapping position and then comparing the degrees of distortion for the entire image so that the distortion is minimized.

The mapping relation indicating which partitioned region of the 2D image each partitioned image of the 3D model surface is mapped to may be expressed with indexes. Assuming that the 3D model is a sphere, the partitioned regions of the 3D model surface which are designated with θx and θy may be mapped with indexes that are designated, starting from the upper and left position of the 2D image, in the order according to raster scanning scheme. Here, raster scanning scheme means a scanning scheme in which horizontal scan lines, constituted of pixes, are scanned one-by-one, from the top line to the bottom on the screen, while sweeping from one side of each line to the other. The mapping relation between the 3D image and the 2D image is stored in the bitstream, and at this time, the mapping relation is created as metadata that is then stored in the form of a look-up table.

The metadata indicates information about the position (θx, θy) and the region (dθx, dθy), in the surface of the sphere, a partition of the planar image, i.e., the 2D image, which has a width of w pixels along the x axis, which indicates the horizontal position, and a height of h pixels along the y axis, which indicates the vertical position, is mapped to.

Meanwhile, the size and shape of each partitioned region may adaptively be determined. FIG. 4A illustrates an example in which the partition size is adjusted. Typically, when the partition size is relatively large, the load of computation increases and the freedom of mapping between the respective partitions of the 3D image and the 2D image reduces, but more accurate interpolation is rendered possible. When the partition size is relatively small, the load of computation and the interpolation accuracy decrease, but the freedom of mapping between the partitions of the 3D and 2D images increases. As the partition size decreases, the freedom of mapping increases, therefore the amount of metadata increases as much. In turn, the partition size and shape are determined to minimize the entire RD cost in consideration of the amount of metadata generated and the degree of distortion in the entire image.

The partition size for the partitioned regions of the 3D model surface is created as metadata, and the metadata necessary to represent the partition size includes unsigned int partitionWidth, unsigned int partitionHeight, and int interpolType. Here, unsigned int partitionWidth denotes the width of the partitions according to the relevant partition size, unsigned int partitionHeight denotes the height of the partitions according to the relevant partition size, and int interpolType denotes the interpolation method. The int interpolType is defined in the form of a look-up table as shown in Table 1 below.

TABLE 1

| Value | interpolType |
| --- | --- |
| 0x00 | Nearest neighbor interpolation |
| 0x01 | Bi-linear interpolation |
| 0x02 | B-spline interpolation |
| 0x03-0xFF | reserved |

In Table 1, nearest neighbor interpolation represented as 0 ×00 means a method in which mesh vertex of a predetermined interval are taken as interpolation points, and the value of the point closest thereto is determined as the value of the interpolation points. Bi-linear interpolation represented as 0×01 means a two-dimensional expansion to the method of linearly determining a value between two points according to the straight-line distances to the two points. B-spline interpolation represented as 0×02 means a method of obtaining a smooth function with a low-order polynomial by dividing the entire section into subsections. Besides, 0x03-0xFF means values reserved to indicate other interpolation schemes than nearest neighbor interpolation, bi-linear interpolation, and B-spline interpolation.

Figure 5:
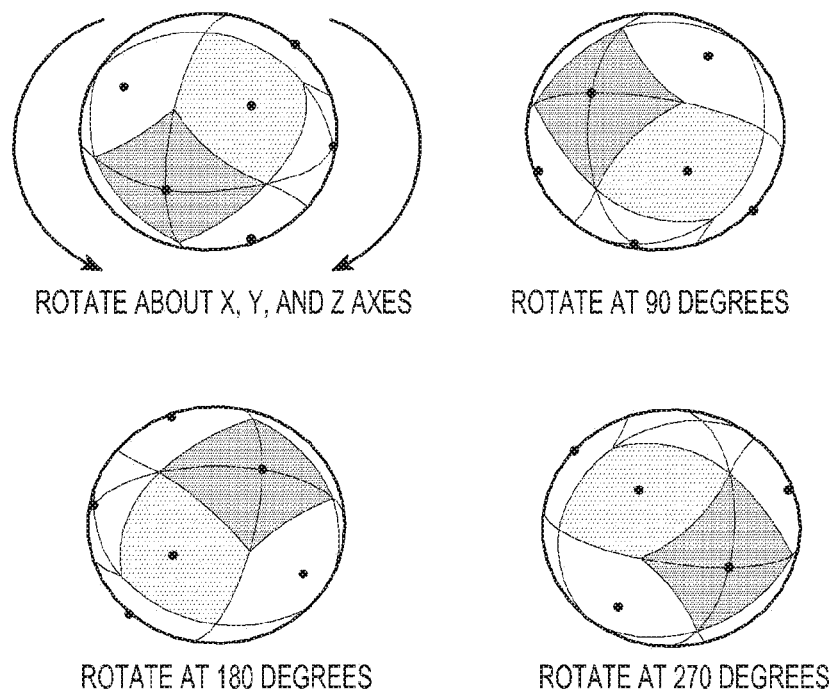
FIG. 5 is a view illustrating an example of adaptively determining a rotating angle considered upon converting a 3D image into a 2D image according to another embodiment of the present disclosure.

FIG. 5 is a view illustrating an example of adaptively determining a rotating angle considered upon converting a 3D image into a 2D image according to another embodiment of the present disclosure.

Referring to FIG. 5, where a 3D image for VR is a 360-degree spherical image, the 360-degree spherical image may be rotated in three directions, e.g., x, y, and z axis. FIG. 5 illustrates an example in which the 360-degree spherical image is rotated at 90 degrees, 180 degrees, and 270 degrees.

The mapping relation indicating which partitioned region of the 2D image each partitioned image of the 3D model surface is mapped to is represented with indexes in the form of a look-up table in which case the amount of metadata stored in the bitstream is significantly large. To reduce the entire RD cost, the amount of metadata needs to be reduced. To reduce the amount of metadata, the mapping relation may be expressed with the index indicating the degree of rotation.

Although the 360-degree spherical image is rotated in the three directions and is then partitioned into a plurality of regions that are then mapped to the 2D image, the position of the object in the raw image is substantially changed. That is, for the 360-degree spherical image rotated in the three directions, the rotating angle for each rotating direction may be expressed as an index, and although only the index for the rotating angle is stored in the bitstream and is transmitted, the freedom of mapping between the partitioned regions of the 3D and 2D images increases.

The mapping relation indicating which partitioned region of the 2D image each partitioned region of the 3D model surface is mapped to may be created as metadata, and the metadata necessary to represent the mapping relation by adaptive rotation contains int angleX, int angleY, and int angleZ. Here, int angleX denotes the rotating angle for the x-axis direction, int angle Y denotes the rotating angle for the y-axis direction, and int angleZ denotes the rotating angle for the z-axis direction.

Figure 6:
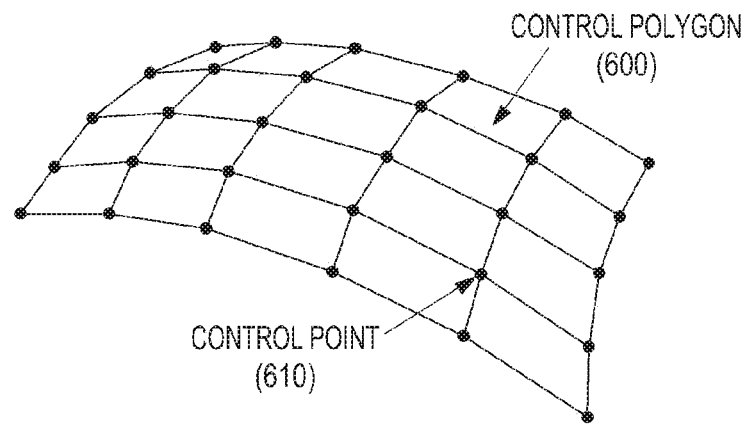
FIG. 6 is a view illustrating an example of adaptively determining whether to apply a control grid interpolation method considered upon converting a 3D image into a 2D image according to still another embodiment of the present disclosure.
Figure 6:
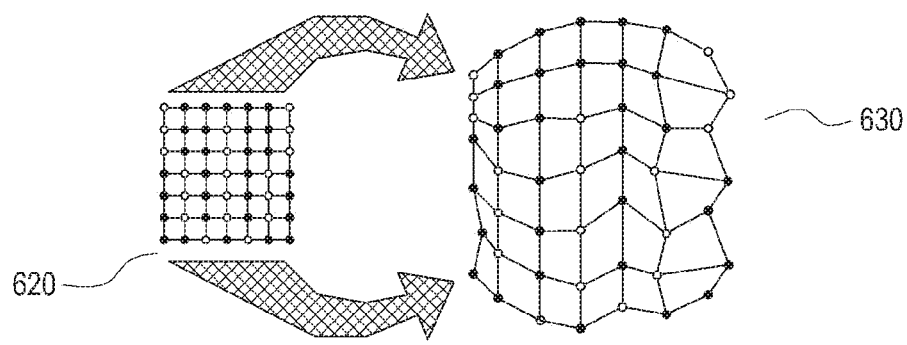

FIG. 6 is a view illustrating an example of adaptively determining whether to apply a control grid interpolation method considered upon converting a 3D image into a 2D image according to still another embodiment of the present disclosure.

Referring to FIG. 6, where a 3D image for VR is a 360-degree spherical image, and the surface of the 360-degree spherical image is assumed to be partitioned into a plurality of regions, the data corresponding to the triangular or rectangular partitioned regions may be converted/inverse-converted from the 3D image to the 2D image or from the 2D image to the 3D image, while maintaining the shape. However, for more accurate mapping per partitioned region, conversion may be performed with the corners of the partitioned region shifted to the left and right by a predetermined distance (dx, dy). At this time, if the shape of the prior partitioned regions was square, the converted regions may be warped to be rectangular or trapezoidal in shape.

That is, assuming that the 360-degree spherical image has a plurality of control points 610 and a control polygon 600 constituted of the plurality of control points 610, if control grid interpolation is applied to the control points arrayed as denoted with reference number 620, the shape of the partitioned regions may be warped as denoted with reference number 630.

Figure 7:
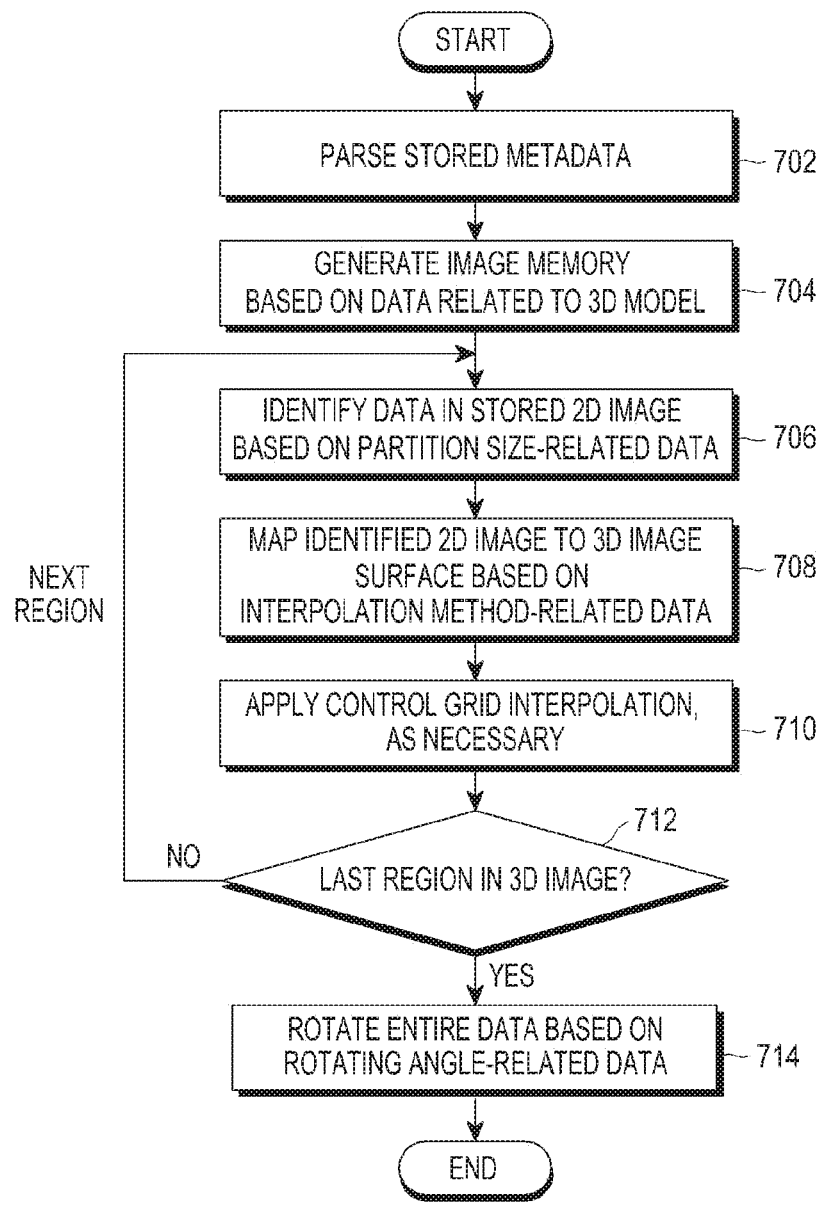
FIG. 7 is a flowchart illustrating operations by an image processing device to restore a 2D image into a 360-degree image according to an embodiment of the present disclosure.

FIG. 7 is a flowchart illustrating operations by an image processing device to restore a 2D image into a 360-degree image according to an embodiment of the present disclosure.

Referring to FIG. 7, in step 702, the image processing device parses stored metadata. Here, the metadata means data related to converting the 360-degree image into the 2D image and includes at least one of, e.g., data related to the rotating angle for each of the x, y, and z axes and the partition size for the 360-degree image, data related to the 3D model to which the 360-degree image is mapped, data related to the interpolation scheme applied upon mapping the 360-degree image to the 2D image, and data related to whether control grid interpolation applies.

In step 704, the image processing device generates an image memory based on the 3D model-related data among the parsed metadata. In step 706, the image processing device identifies the image data in units of the partition size indicated by the partition size-related data in the stored 2D image, based on the partition size-related data among the parsed metadata. It is assumed here that the image data in the corresponding positions are identified, starting from the upper and left region among the partitioned regions of the 2D image, in the order according to raster scanning scheme.

In step 708, the image processing device maps the image data identified in step 706 to the 3D image surface based on the interpolation-related data among the parsed metadata. Here, the 3D model considered upon mapping to the 3D image surface follows the 3D model-related data of step 704. In step 710, the image processing device determines whether it is needed to apply control grid interpolation based on the data related to whether to apply control grid interpolation among the parsed metadata, and as necessary, applies control grid interpolation.

In step 712, the image processing device checks whether the region in the 3D image restored via steps 707 to 710 is the last region among the partitioned regions. If the region in the restored 3D image is the last region among the partitioned regions as a result of the check of step 712, the image processing device proceeds with step 714, rotating the whole 3D image data based on the data related to the rotating angle for each of the x, y, and z axes for the 360-degree image and hence restoring the 360-degree image.

On the other hand, if the region in the restored 3D image is not the last one of the partitioned regions as a result of the check of step 712, the image processing device goes back to step 706, repeating steps 706 to 710 on the next region according to raster scanning scheme. Such operations are repeated until reaching the image data of the last region.

Although specific embodiments of the present disclosure have been described above, various changes may be made thereto without departing from the scope of the present disclosure. Thus, the scope of the present disclosure should not be limited to the above-described embodiments, and should rather be defined by the following claims and equivalents thereof.

The invention claimed is:

1. A method for processing 360-degree multi-view images, the method comprising:
    identifying, by a processor of an electronic device, media data for a two-dimensional (2D) image which is generated based on projecting a three-dimensional (3D) image to a planar space, and metadata related to the media data; and
    transmitting, by the processor of the electronic device, the identified media data and the identified metadata,
    wherein the 3D image is generated based on the 360-degree multi-view images, and wherein the metadata comprises:
   information indicating a 3D model for mapping the 2D image to the 3D model among a plurality of 3D models, and
   information indicating a rotating angle according to each of an x-axis, a y-axis, and a z-axis for the 3D image.

2. The method of claim 1, further comprising:
determining whether a partition size, the rotating angles, and an interpolation method for the 3D image which minimizes distortion at a predetermined bitrate by comparing degrees of distortion for 2D images based on other partition sizes, other rotating angles, and another interpolation method, and a degree of distortion for the 2D images based on the partition size, the rotating angles, and the interpolation method,
wherein the metadata further comprises information indicating the partition size for the 3D image and an interpolation method for the 3D image.

3. The method of claim 2, further comprising, when the partition size, the rotating angles, and the interpolation method are not determined to minimize the distortion at the predetermined bitrate, re-determining the partition size, the rotating angles, and the interpolation method.

4. The method of claim 3, wherein the partition size for the 3D image is determined as a value to minimize an entire rate-distortion (RD) cost based on an amount of the metadata and the degree of distortion for the 2D image.

5. The method of claim 1, further comprising:
determining whether to apply a control grid interpolation method in which control points in partitioned regions of the 3D image are shifted in the direction of the x-axis and/or the y-axis by a predetermined distance to be varied for mapping each corner of the partitioned regions,
wherein the control points are corners of the partitioned regions.

6. The method of claim 1, further comprising:
mapping non-background contents in the 3D image to relatively less distorted regions in the 2D image; and
mapping background contents in the 3D image to a relatively more distorted regions in the 2D image.

7. A method for processing 360-degree multi-view images, the method comprising:
receiving, by a processor of an electronic device, media data for a two-dimensional (2D) image which is generated based on projecting a three-dimensional (3D) image to a planar space, and metadata related to the media data, wherein the 3D image is generated based on the 360-degree multi-view images; and
rendering, by the processor of the electronic device, received media data based on the received metadata,
wherein the metadata comprises:
   information indicating a 3D model for mapping the 2D image to the 3D model among a plurality of 3D models, and
   information indicating a rotating angle according to each of an x-axis, a y-axis, and a z-axis for the 3D image.

8. The method of claim 7, wherein the rendering of the received media data further comprises:
mapping the 2D image to the 3D model based on the information indicating the 3D model, and
rotating the mapped 2D image on the 3D model based on the information indicating the rotating angles.

9. The method of claim 8, further comprising:
applying a control grid interpolation method to the 2D image,
wherein the control grid interpolation method is a method in which control points in a partitioned regions are shifted in a direction of the x-axis and/or the y-axis by a predetermined distance to be varied.

10. A device for processing 360-degree multi-view images, the device comprising:
a transceiver; and
a processor coupled to the transceiver, wherein the processor is configured to:
   identify media data for a two-dimensional (2D) image which is generated based on projecting a three-dimensional (3D) image to a planar space, and metadata related to the media data, and
   transmit the identified media data and the identified metadata, wherein the 3D image is generated based on the 360-degree multi-view images, wherein the metadata comprises:
   information indicating a 3D model for mapping the 2D image to the 3D model among a plurality of 3D models, and
   information indicating a rotating angle according to each of an x-axis, a y-axis, and a z-axis for the 3D image.

11. The device of claim 10, wherein the processor is further configured to:
determine whether a partition size, the rotating angles, and an interpolation method minimizes distortion at a predetermined bitrate by comparing degrees of distortion for the 2D image based on other partition sizes, other rotating angles, and another interpolation method, and a degree of distortion for the 2D image based on the partition size, the rotating angles, and the interpolation method,
wherein the metadata further comprises information indicating the partition size for the 3D image and an interpolation method for the 3D image.

12. A device for processing 360-degree multi-view images, the device comprising:
a transceiver; and
a processor coupled to the transceiver, wherein the processor is configured to:
   receive media data for a two-dimensional (2D) image which is generated based on projecting a three-dimensional (3D) image to a planar space, and metadata related to the media data, wherein the 3D image is generated based on the 360-degree multi-view images, and
   render the received media data based on the received metadata, wherein the metadata comprises:
   information indicating a 3D model for mapping the 2D image to the 3D model among a plurality of 3D models, and
   information indicating a rotating angle according to each of an x-axis, a y-axis, and a z-axis for the 3D image.

13. The device of claim 12, wherein, to render the received media data, the processor is further configured to:
map the 2D image to the 3D model based on the information indicating the 3D model, and
rotate the mapped 2D image on the 3D model based on the information indicating the rotating angles.

* * * * *